United States Patent
Hsia

(10) Patent No.: US 9,141,510 B2
(45) Date of Patent: Sep. 22, 2015

(54) MEMORY ALLOCATION TRACKING

(75) Inventor: Calvin Hsia, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 491 days.

(21) Appl. No.: 13/217,222

(22) Filed: Aug. 24, 2011

(65) Prior Publication Data

US 2013/0054925 A1    Feb. 28, 2013

(51) Int. Cl.
*G06F 12/00* (2006.01)
*G06F 11/36* (2006.01)
*G06F 9/50* (2006.01)

(52) U.S. Cl.
CPC .......... *G06F 11/3604* (2013.01); *G06F 9/5016* (2013.01); *G06F 2209/508* (2013.01)

(58) Field of Classification Search
CPC .......... G06F 11/3604; G06F 2209/508; G06F 9/5016
See application file for complete search history.

(56) References Cited

U.S. PATENT DOCUMENTS

| | | | |
|---|---|---|---|
| 5,809,554 A | 9/1998 | Benayon | |
| 5,920,876 A | 7/1999 | Ungar | |
| 5,949,972 A | 9/1999 | Applegate | |
| 6,125,434 A * | 9/2000 | Willard et al. | 711/170 |
| 6,560,773 B1 | 5/2003 | Alexander, III | |
| 6,643,753 B2 | 11/2003 | Avner | |
| 6,658,652 B1 | 12/2003 | Alexander | |
| 6,728,907 B1 * | 4/2004 | Wang et al. | 714/47.1 |
| 6,782,462 B2 | 8/2004 | Marion et al. | |
| 6,889,297 B2 | 5/2005 | Krapp et al. | |
| 7,089,460 B2 | 8/2006 | Fu | |
| 7,111,294 B2 | 9/2006 | Steensgaard | |
| 7,200,731 B2 | 4/2007 | Raut | |
| 7,284,107 B2 | 10/2007 | Wilman | |
| 7,487,321 B2 | 2/2009 | Muthiah et al. | |
| 7,500,077 B2 | 3/2009 | Krauss | |
| 7,500,079 B2 | 3/2009 | Becker | |
| 7,506,129 B2 | 3/2009 | Raut | |
| 7,577,943 B2 | 8/2009 | Chilimbi et al. | |
| 7,716,648 B2 | 5/2010 | Vaidyanathan et al. | |
| 7,761,852 B2 | 7/2010 | Gilgen | |
| 7,774,741 B2 | 8/2010 | Sridharan | |
| 7,827,538 B2 | 11/2010 | Trotter | |
| 7,870,358 B2 | 1/2011 | Yang | |
| 7,908,454 B2 | 3/2011 | Leung | |
| 2002/0116573 A1 | 8/2002 | Gold | |

(Continued)

OTHER PUBLICATIONS

Jonas Maebe, et al;Precise Detection of Memory Leaks; pp. 1-7.

(Continued)

*Primary Examiner* — Cheng-Yuan Tseng
*Assistant Examiner* — Alan Otto
(74) *Attorney, Agent, or Firm* — Kevin Sullivan; Kate Drakos; Micky Minhas

(57) ABSTRACT

The subject disclosure relates to tracking and/or auditing memory allocations for one or more computer-implemented processes. In particular, memory allocation commands as well as memory free commands, both native and managed, can be intercepted. As such, a tag can be created that can be associated with a particular memory allocation. This tag can include various information that can more robustly describe the current state of system memory. Moreover, the tag can be deleted as an associated memory free command is received. Thus, as memory is freed and therefore no longer relevant to the current state of system memory, such does not clutter present examination.

20 Claims, 12 Drawing Sheets

(56) References Cited

U.S. PATENT DOCUMENTS

| | | | |
|---|---|---|---|
| 2005/0081190 A1 | 4/2005 | Betancourt | |
| 2006/0195823 A1* | 8/2006 | Bentolila | 717/127 |
| 2009/0328007 A1* | 12/2009 | Chen et al. | 717/128 |
| 2010/0031238 A1 | 2/2010 | Li et al. | |

OTHER PUBLICATIONS

Binbin Qu, et al; Memory leak dynamic monitor based on HOOK technique; Dec. 2009.

Detours; Microsoft Research; May 13, 2011.

ICorProfilerCallback Interface; May 13, 2011.

Umdhtools.exe_How to use Umdh.exe to find Memory Leaks; Article ID 268343; Last Review Apr. 25, 2007.

Calvin Hsia, Examin.Net Memory Leaks; MSDN Blogs; Apr. 11, 2008.

SOS.dll; SOS Debugging extension; May 13, 2011.

Xie, et al., Context and Path sensitive Memory Leak Detection:, Retrieved at <<http://citeseerx.ist.psu.edu/viewdoc/download-?doi+10.1.1.88.2239&rep=rep1&type=pdf>>, In the proceedings of the 10th European software engineering conference held jointly with 13th ACM SIGSOFT international symposium on Foundations of software engineering, vol. 30, Issue 5, Sep. 5-9, 2005, pp. 115-125.

Xu, et al., "Path and Context Sensitive Inter-procedural Memory Leak Detection", Retrieved at <<http://Ics.ios.ad.cn/~xzx/memleak.pdf>>, Proceedings of the 2008 the Eighth International Conference on Quality Software, 2008, pp. 9.

Kiyokuni Kawachiya, et al., Analysis and Reduction of Memory Inefficiencies in Java Strings, Oct. 19-23, 2008.

Kiyokuni Kawachiya, et al., An Efficient Heap Management Technique with Minimum Fragmentation and Auto Compaction, Jul. 29, 2010.

Mark Russinovich and Bryce Cogswell, VMMap v3.03, May 13, 2011.

Office Action mailed Jan. 7, 2014, in U.S. Appl. No. 13/217,224, 22 pages.

Office Action mailed Dec. 20, 2014, in U.S. Appl. No. 13/216,275, 19 pages.

Office Action mailed Jun. 20, 2014, in U.S. Appl. No. 13/217,224, 22 pages.

Notice of Allowance mailed Jun. 12, 2014, in U.S. Appl. No. 13/216,275, 8 pages.

Notice of Allowance mailed Jul. 18, 2014, in U.S. Appl. No. 13/217,224, 8 pages.

* cited by examiner

MEMORY ALLOCATION TRACKING

CROSS-REFERENCE TO RELATED APPLICATIONS

This application is related to co-pending U.S. patent application Ser. No. 13/217,224 entitled, "MEMORY ALLOCATION ANALYSIS", filed on Aug. 24, 2011, and to co-pending U.S. patent application Ser. No. 13/216,275 entitled, "AUTOMATIC MEMORY LEAK DETECTION", filed on Aug. 24, 2011, the entireties of each of which applications are incorporated herein by reference.

TECHNICAL FIELD

The subject disclosure generally relates to tracking computer system memory that is allocated by processes or modules running on a computer.

BACKGROUND

In the domain of software application development, a prolific difficulty is avoidance of memory leaks. Memory leaks can lead to inefficient use of system resources, if not instability of the system or a particular application executing thereon. When attempting to detect a memory leak, a particular scenario might repeat multiple times, with perhaps millions of memory allocations and associated memory releases or "frees". Call stacks collected for native memory allocations must be manually matched with their associated memory free, since unmatched memory that was not freed could constitute a leak.

Engaging in the matching process constitutes an enormous amount of labor that currently must be accomplished manually, by a developer. Moreover, once done, even if accurately so, finding a memory leak is still problematic and requires analysis of huge amounts of data. Moreover, this process is particularly difficult in a garbage collected (e.g., "managed") system where there are no explicit memory frees. Furthermore, unmatched leftover memory allocations are to be associated with scenario iteration. A pattern of allocations per iteration, such as 23 identical allocations, could be a leak, but might not be.

There are many software utilities or tools intended aid in this process, for example, by presenting various information known about the current or historic state of system memory. One such tool is User Mode Dump Heap (UMDH), which is described at http colon slash slash support dot Microsoft dot com slash kb slash 268343. UMDH can record the call stack of heap allocations. Thus, for each unique stack, UMDH will total the memory allocations. Typically, UMDH operates by running a particular scenario twice to get two related UMDH dumps. From these two scenarios, the differences between them will show which memory allocations and totals were made between the two iterations. However, UMDH has numerous shortcomings. In particular, UMDH is not applicable beyond native memory calls, and thus is not useful in the case of managed or non-native calls. Secondly, UMDH is not an interactive tool, but rather is useful for post-scenario analysis instead. Third, UMDH is not capable of identifying certain inefficient memory usage, but rather aids in detecting memory leaks instead. Fourth, UMDH is not compatible with certain types of memory allocation commands, such as VirtualAlloc, mapped files, or as noted, managed code.

Another memory tool is WinDbg and Visual Studio debugger extension called SOS.DLL, which is detailed at http colon slash slash msdn dot Microsoft dot com slash en dash us slash library slash bb19074 dot aspx. SOS.DLL allows a user to dump the managed heap. From that dump, one can view counts and references of various managed objects. However, SOS.DLL does not utilize call stacks and further is not compatible with native memory calls, but rather managed memory calls instead. As such, SOS.DLL can give many false positives in connection with leak detection, especially if no garbage collection has yet occurred.

A third tool is Common Language Runtime (CLR) Profiler. CLR Profiler allows a user to see managed objects, but has no native memory allocations components.

The above-described deficiencies of today's techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, the disclosed subject matter relates to an architecture that can facilitate robust tracking and/or auditing of allocated computer system memory. In accordance therewith, the architecture can include an intercept component that can be configured to intercept a memory call from at least one process that allocates computer memory or releases computer memory. Typically, the memory call is a memory allocation instruction or a memory release instruction, and it is noted that in either case, the memory call can be explicitly called by native instructions or called in accordance with managed instructions.

In addition, the architecture can include a record component configured to create and store a tag in response to interception of the memory allocation instruction. Generally, the tag can include a call stack associated with the at least one process, an allocation size of the memory allocation instruction, a thread identification, and a tag sequence number. Furthermore, the architecture can include a matching component that configured to delete the tag in response to a matching memory release instruction. Hence, memory included in the tags will relate to memory that is currently allocated by the at least one process.

Moreover, in one or more embodiment, the architecture can provide a method for intercepting a memory transaction from at least one process that allocates computer memory or frees computer memory, wherein the memory transaction is a memory allocation command or a memory free command.

The method can further provide creating a tag in response to intercepting the memory allocation command and for including in the tag a call stack associated with the at least one process, an allocation size of the memory allocation, a thread identification, and a tag sequence number. Likewise, the method can provide for storing the tag to a private memory heap and deleting the tag in response to a matching memory free command.

In still another embodiment, the architecture can include an intercept component stored in a computer readable storage medium configured to intercept memory allocation calls and memory release calls from at least one process that allocates computer memory or frees computer memory according to either managed commands or native instructions. The intercept component is further configured to allocate memory in accordance with the memory allocation calls.

The architecture can further include a record component configured to create and store a tag in response to interception of at least one memory allocation call. The tag includes a call stack associated with the at least one process, an allocation size of the memory allocation instruction, a thread identification, and a tag sequence number. Likewise, the architecture can include a matching component configured to delete the tag in response to a corresponding memory release call. The matching component is further configured to release the memory in accordance with the memory release call.

These and other embodiments are described in more detail below.

BRIEF DESCRIPTION OF THE DRAWINGS

The system and methods for representing synchronization knowledge and/or partial knowledge for multiple nodes sharing subsets of a set of information are further described with reference to the accompanying drawings in which.

DETAILED DESCRIPTION

Overview

By way of an introduction, the subject matter disclosed herein relates to various embodiments relating to comprehensively tracking and/or auditing of computer-based memory allocations. In particular, the subject matter can provide a mechanism to intercept certain memory transactions or calls, such as, e.g., memory allocations or memory releases or "frees". Such memory transactions can originate from either native code or from managed code, for example, from the process or a related process or thread that provides for the allocation or from a garbage collection process or routine. Of these memory transactions, those that represent allocations can be recorded by way of an associated tag that stores information relating to a particular memory allocation instruction (e.g., the type of allocation, the entity issuing the instruction, the amount of memory, . . . ).

Generally, if a corresponding memory release or free instruction is intercepted, then an associated tag is also freed as well, thus eliminating the need for manually matching items when viewing information associated with memory and/or call stacks. It is noted that removing tags in connection with memory release commands can be more straightforward when the release command is explicitly issued by native code than when occurring in connection with garbage collection routines in which no explicit release call is provided by the native code, but is instead ordered according to inherent memory protocols. Thus, the disclosed subject matter can track objects or other memory allocations throughout any garbage collection operation in order, e.g., to determine whether the memory allocation is indeed garbage or to associate the memory allocation that has been moved (e.g., due to a defragmentation operation) by a garbage collection operation with the original memory allocation tag.

In order to effectuate certain memory tracking elements, the disclosed subject matter can record a call stack associated with any given memory allocation instruction, and place that information in the associated tag. Along with the call stack, memory allocations can also be tagged with a thread ID, a sequence number (e.g., 0, 1, 2, 3 . . . ) as well as other pertinent information. It is thus noted that data included in a given tag can enable ready recognition of how leftovers are distributed in time with the scenario iteration. For example, if there are 321 allocations per iteration, one can be instantly apprised of a likely memory leak.

In addition, as introduced above, various objects or other memory allocations can be tracked through garbage collection operations. These allocations can also be tagged with a number of times an object has survived or moved in a garbage collection operation as well as the particular garbage collection generation of the object (e.g., Gen 0, Gen 1, . . . ), which can provide more robust features in connection with managed memory constraints.

Tracking Memory Allocations

Figure 1:
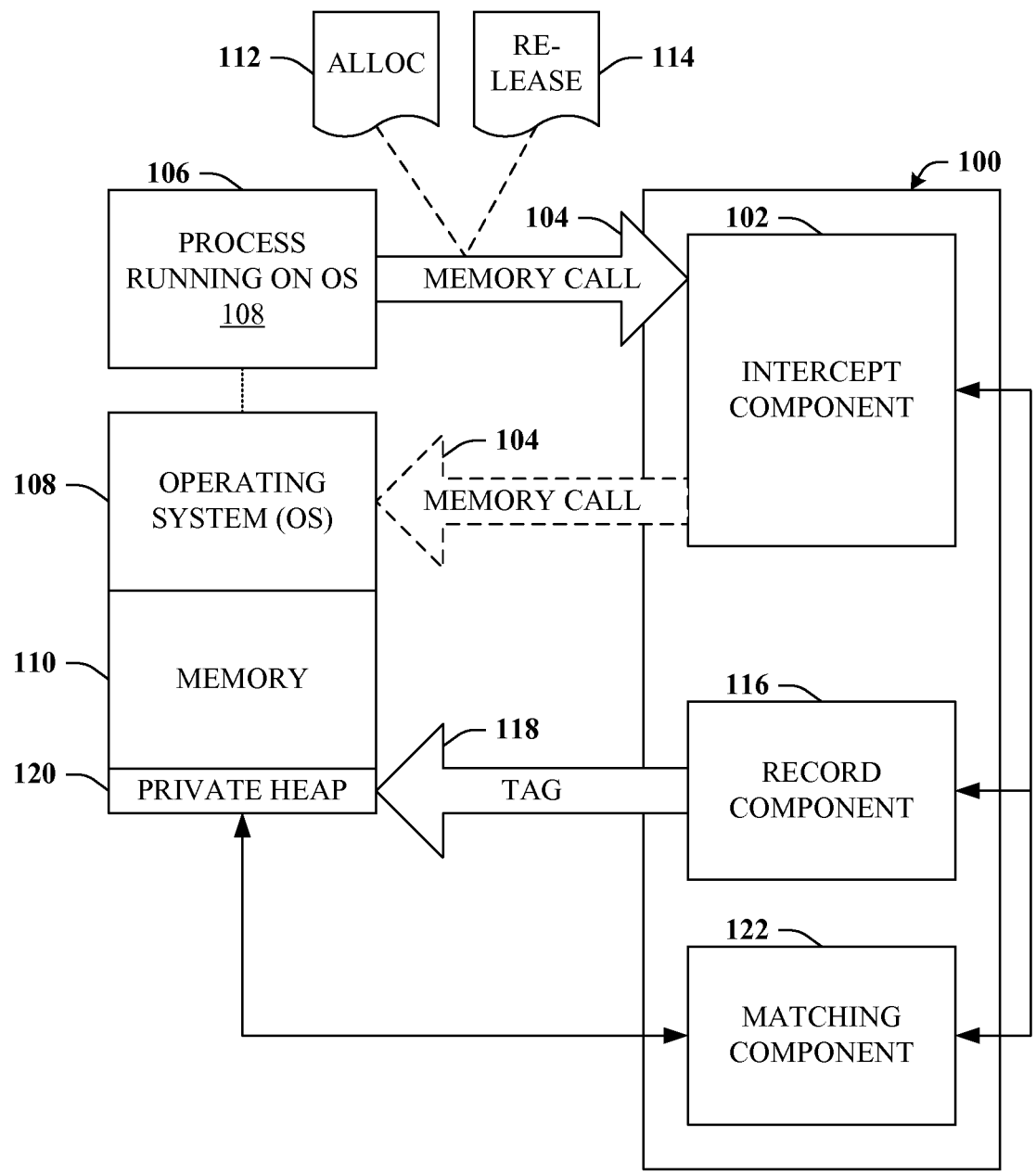
FIG. 1 illustrates a block diagram of an exemplary non-limiting system that can track computer-based memory allocation.

Referring now to the drawings, with reference initially to FIG. 1, system 100 that can track computer-based memory allocation is depicted. Generally, system 100 can include intercept component 102 that, as with all components described herein can be stored in a computer readable storage medium. Intercept component 102 can be configured to intercept memory call 104 from at least one process 106. The at least one process 106 can be in active execution by operating system 108, which can be coupled to and/or provide administration of memory 110. Hence, the at least one process 106 can issue memory call 104 for the express purpose of allocating computer memory 110 or releases computer memory 110. Thus, it is noted that memory call 104 can encompass either or both memory allocation instruction 112 or a memory release instruction 114, depending upon whether process 106 orders a memory allocation or a memory release (or "free"). These and other features are depicted with reference to FIGS. 2A and 2B.

Figure 2A:
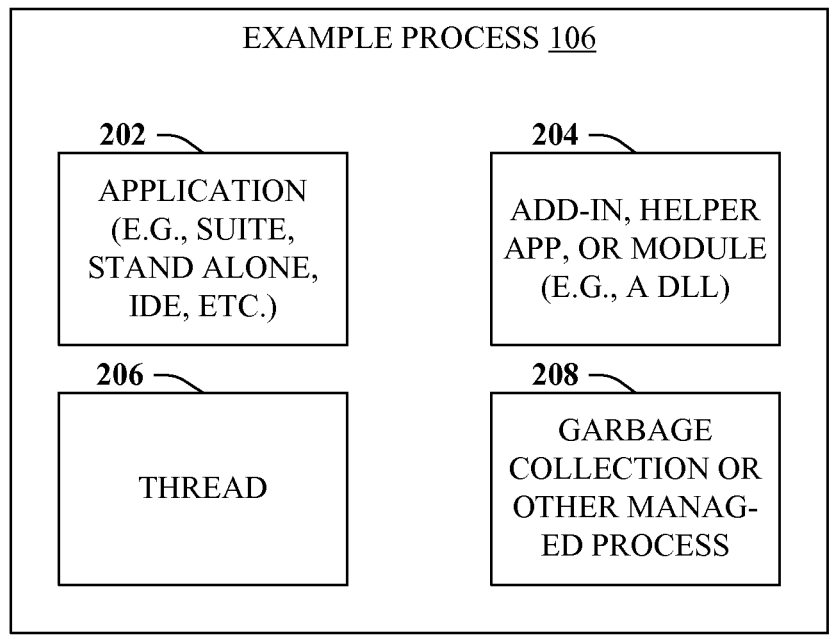
FIG. 2A illustrates a block diagram of various non-limiting examples of a process.
Figure 2B:
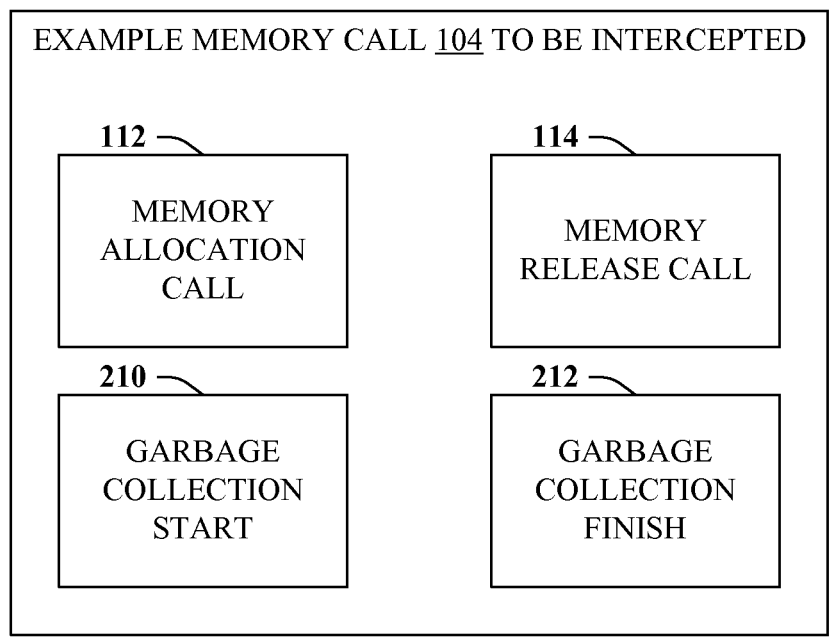
FIG. 2B illustrates a block diagram of various non-limiting examples of a memory call.

For example, while still referring to FIG. 1, but turning now as well to FIGS. 2A and 2B, FIG. 2A illustrates various examples of process 106, whereas FIG. 2B provides various examples of memory call 104. With particular reference to FIG. 2A, process 106 can be associated with, e.g., substantially any application 202. For instance, application 202 can be a suite of related applications, a stand-alone application, one or more integrated development environment (IDE) applications and so forth. Moreover, process 106 can be associated with one or more add-in application, a module such as a dynamic linked library (DLL), or helper application 204 or an application or instance subsequently invoked by application 202. Likewise, another example of at least one process 106 can be thread 206 invoked or otherwise related to application 202 or helper application 204. Additionally or alternatively, example process 106 can relate to garbage collection process 208 or some other managed process or operation.

Referring particularly to FIG. 2B, four example memory call 104 types are illustrated. As introduced above, in the first case, an example of memory call 104 can be memory allocation call 112. In the second example, memory call 104 can be memory release (or free) call 114. In addition, various garbage collection instructions can be intercepted as well, such as garbage collection (GC) Start 210 and GC Finish 212, which are further discussed infra.

Still referring to FIG. 1, it is noted that while intercept component 102 can intercept memory call 104, in one or more aspect, intercept component 102 can further forward or pass memory call 104 to its originally intended destination, generally OS 108 or to a heap or other relevant portion of a file system (not shown). Thus, operation of system 100 can be substantially transparent to process 106. Whether intercept component 102 forwards memory call 104 or otherwise facilitates suitable allocation of the expected memory, such is generally accomplished with as little delay or latency as possible. For example, memory call 104 can be intercepted, rapidly processed, and immediately forwarded. As another example, memory call 104 can be intercepted, copied to a register or cache and immediately forwarded with the copy temporarily available for processing thereafter.

Hence, in one or more aspect intercept component 102 can be further configured to allocate memory (e.g., by forwarding memory call 104) in accordance with memory allocation instruction 112 that was previously intercepted. Likewise, in one or more aspect intercept component 102 can be further configured to release memory in accordance with memory release instruction 114 that was previously intercepted.

In addition, system 100 can further include record component 116 configured to create and store tag 118 in response to interception of memory allocation instruction 112 (e.g., one particular type of memory call 104). In particular, tag 118 can include a call stack associated with at least one process 106, an allocation size of memory allocation instruction 112, a thread identification, and a tag 118 sequence number. It is noted that tag 118 can also be constructed to include other suitable data as well. In one or more aspect, tag 118 can be stored to private heap 120, which can be a portion of memory 110 specifically allocated for use by the disclosed subject matter. Additional detail in connection with private heap 120 is detailed infra.

Furthermore, system 100 can include matching component 122 that can be configured to delete tag 118 in response to a matching memory release instruction 114. For example, when a given tag 118 is created by an initial memory allocation instruction (e.g., 112), then a subsequent memory release instruction (e.g., 114) associated with the memory allocated by the initial memory allocation instruction can prompt matching component 122 to delete an associated tag. Hence, memory that was previously allocated, but later freed need not be included in any examination of currently allocated memory for the at least one process 106. As such, when examining currently allocated memory, users are not required to manually match or offset initial allocations with subsequent memory releases in order to identify or track potential memory leaks or to perform other analyses.

As discussed supra, memory call 104 (e.g., memory allocation instruction 112 or memory release instruction 114) can be configured in accordance with either or both native models where freeing previously allocated memory is explicitly provided or managed models where freeing previously allocated memory is handled by preconfigured entities designed for such purposes, such as garbage collection operations. Accordingly, the described subject matter can operate according to various configurations, scenarios, and/or embodiments, some of which are further detailed with reference to FIGS. 3-5.

Figure 3:
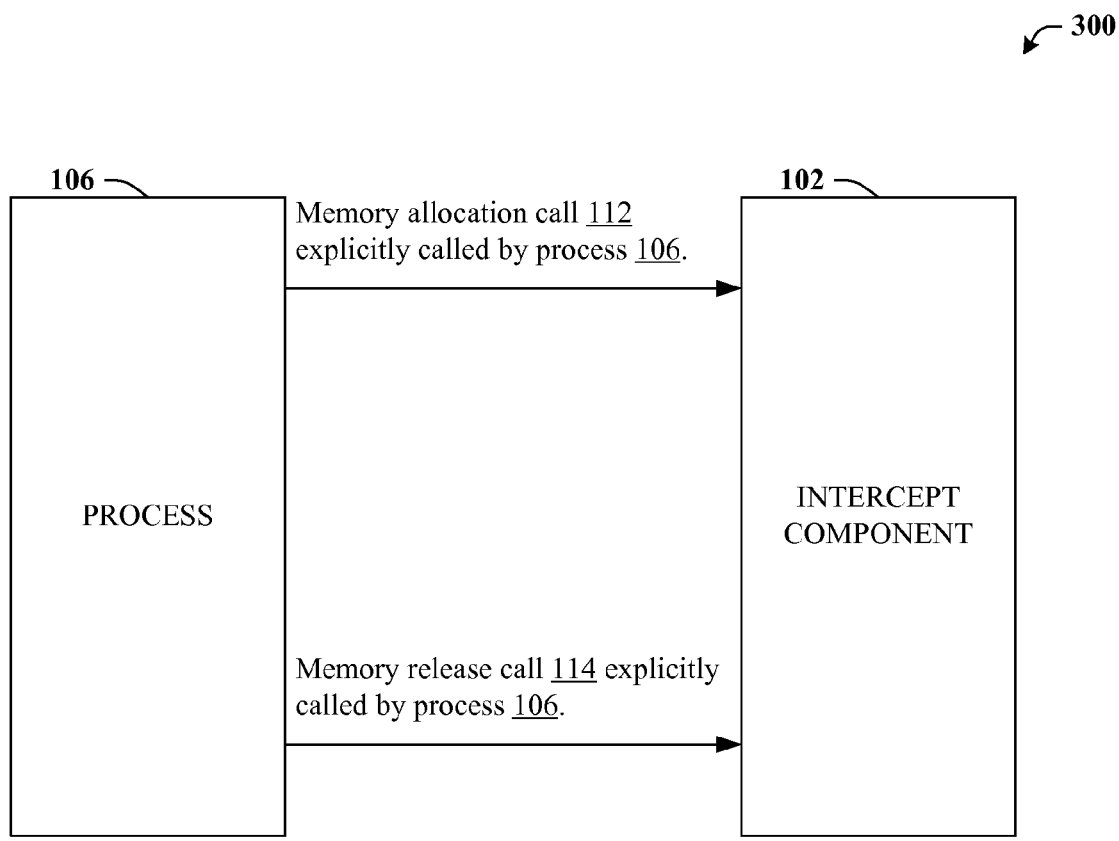
FIG. 3 illustrates a block diagram of an exemplary system in which a memory release call is received from the same process that previously allocated the associated memory.
Figure 4:
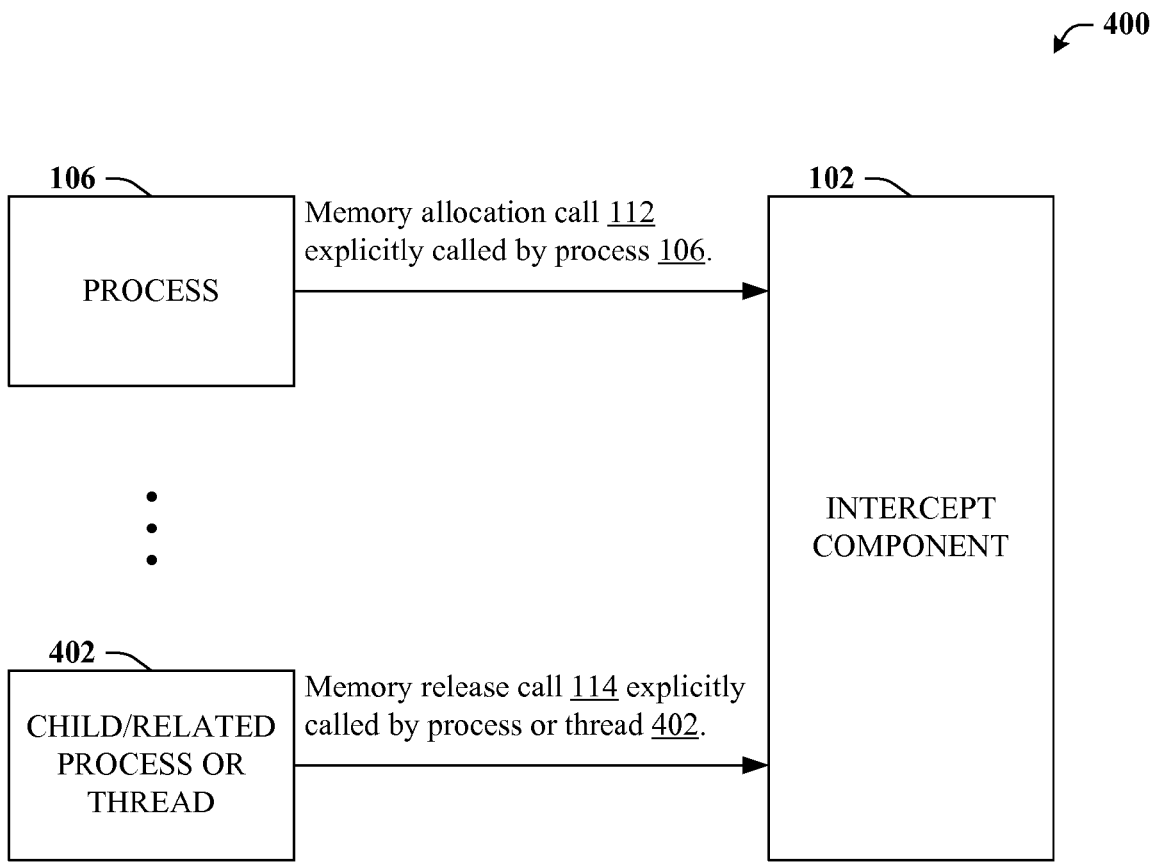
FIG. 4 is block diagram of an exemplary system in which a memory release call is received from a different process than the process that previously allocated the associated memory.
Figure 5:
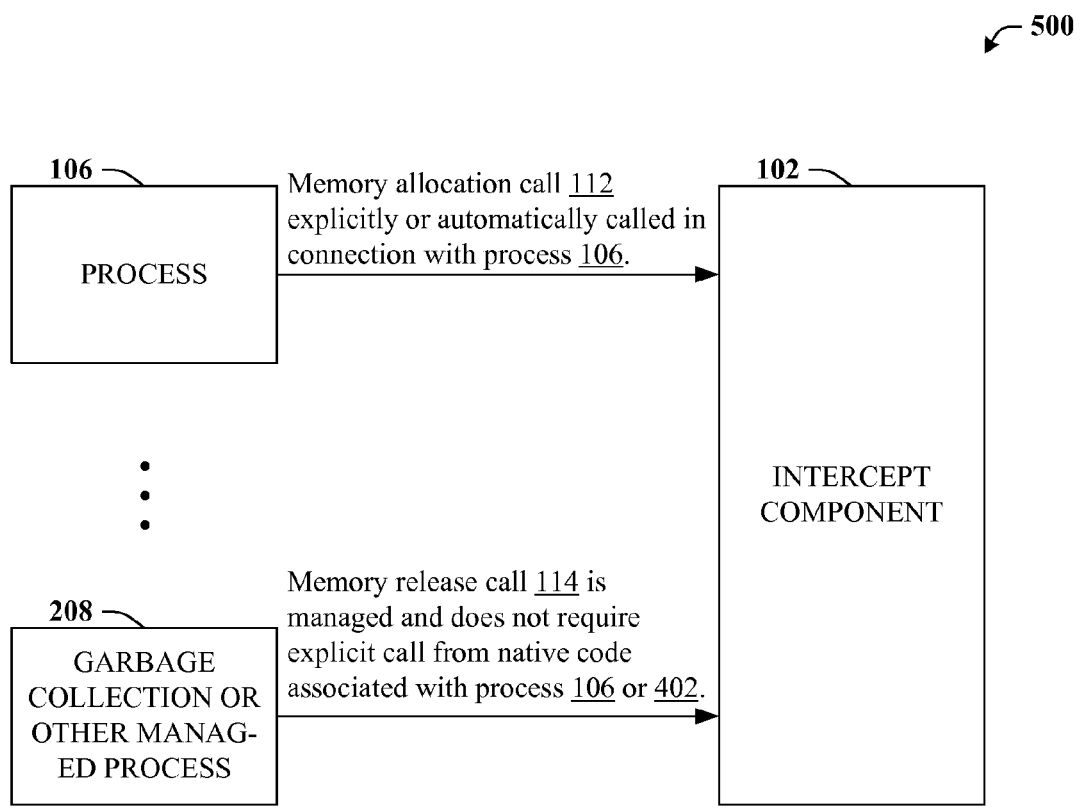
FIG. 5 is block diagram of an exemplary system in which a memory release call is managed and does not require an explicit call from native or managed code associated with the allocating process or another process related thereto.

While still referring to FIG. 1, but turning now as well to FIGS. 3-5, various aspects relating to native and managed memory calls are provided. In particular, FIG. 3 discloses system 300 in which a memory release call is received from the same process that previously allocated the associated memory. Thus, system 300 includes intercept component 102 illustrated to intercept memory allocation 112 explicitly called by process 106. In addition, intercept component 102 subsequently intercepts an associated memory release call (e.g., 114) explicitly called by process 106.

Similarly, FIG. 4 discloses system 400 in which a memory release call is received from a different process than the process that previously allocated the associated memory. Thus, system 400 includes intercept component 102 illustrated to intercept memory allocation 112 explicitly called by process 106. However, it is appreciated that in many cases, a particular process that allocates memory can do so for consumption by another process, such as a child process or another related process or thread, denoted here as related process 402. In such cases, intercept component 102 can subsequently intercept an associated memory release call (e.g., 114) explicitly called by related process 402.

In contrast, FIG. 5 illustrates system 500 in which a memory release call is managed and does not require an explicit call from native code associated with the allocating process or another process related thereto. Thus, system 500 includes intercept component 102 illustrated to intercept memory allocation 112 explicitly or automatically called in connection with process 106. However, rather than expecting a corresponding memory release call, such can be managed by, e.g., a garbage collection operation or algorithm or another managed process, denoted as garbage collection process 208. In the case of managed operations such as garbage collection routines, intercept component 102 can subsequently intercept an associated memory release call (e.g., GC Start 210, GC Finish 212, . . . ) explicitly called by garbage collection process 208.

Continuing the discussion of FIG. 1, and with the foregoing in mind, additional detail can now be provided. In the context of the disclosed subject matter, it is understood that individual application programs run on a computer as a process (e.g., process 106) administered by an operating system (e.g., OS 108). Programs call (e.g., memory calls 104) to the OS to allocate or free memory are provided as needed for the application to function as intended. However, due to a variety of factors, memory (e.g., memory 110) use by a program (e.g., application 202) can be problematic.

For example, when executing code from a particular process, there could be repeated allocations that are not freed, causing memory leaks, which can ultimately result in abnormal program termination, such as a crash. However, not all code that allocates memory, but later fails to free that memory can be considered a memory leak. In fact, many cases arise in which such is quite acceptable such as when allocated memory, along with the responsibility to later free that memory, is passed to some other process or code (e.g., related process 402).

Another problematic issue with memory use by a program is that repeated non-leaking allocations can result in memory fragmentation. Thus, memory that is allocated and subsequently properly released can lead to a section of memory that is free that is not contiguous with other free sections of memory, resulting in successively smaller pieces of free memory. Eventually a memory request might be denied, resulting in failure, if the size of the memory request exceeds any available free section in the fragmented memory, even when the total amount of free memory is greater than the size of the memory request.

Yet another issue with memory use by a program relates to inefficient use. Inefficient memory use can cause performance degradation. For example, as more memory is used, more hard disk accesses can occur, and hard disk access is thousands of times slower than memory access. Such inefficient memory use can be caused by a variety of factors that commonly plague design and implementation of applications or programs.

For example, a particular program might allocate 10,000 bytes, but use only 100 bytes in connection with the much larger allocation. Similarly, a particular program might allocate 10,000 bytes, but use only a sparse pattern, such as 5 bytes out of every 100 bytes. Moreover, a particular program might, whether unintentionally or intentionally, might create many superfluous duplicate allocations or an allocation routine might double the size of the requested size intentionally based upon an assumption the data needed is Unicode, which takes two bytes per character, or based upon other design flaws or misconceptions. As still another example, code that lives in a module, such as a dynamic linked library (e.g., .DLL) file might be loaded into memory, but never accessed or otherwise used.

Furthermore, consider that with an extensible model for program development, dozens of internal and external teams can contribute code to the process, some of which can span many years, changes in constraints, approaches, goals, or policies, further complicating the memory picture. Hence, the code, and the execution of that code, is not often streamlined to consume smaller amounts of memory. Moreover, identifying these problems can be extremely difficult.

Difficulties in identifying these and related problems can arise for a variety of reasons. Generally speaking, memory use is essentially invisible to developers at many stages of the development process. One can readily see the total memory use at a particular instant. For example, any suitable memory performance monitor can show various totals, and one can observe whether or not these totals grow in size to infer a memory leak. However, a small leak can be extremely difficult to detect. Moreover, certain program behaviors might make it even more difficult to detect leaks.

For instance, certain programs can provide an "undo" feature. Thus, a user can provide numerous inputs, then select the undo feature many times. By relying upon memory storage, the program "remembers" which actions to undo and in precise order. Typically, such memory results in a normal memory use growth. As another example, certain programs can include a cache. Hence, a program can accumulate disk information in memory in order to speed up associated operations, which can also yield memory use growth.

Regardless, finding the exact code that causes a memory leak or other memory use growth can be quite complex for previous systems and users of those systems. In particular, a user examining memory use can be confronted with hundreds of millions of instructions executed per second with many thousands of memory allocations. Thus, the sheer volume of allocations can be difficult to track much less efficiently visualize or comprehend. Moreover, even upon successful identification of a particular 10 bytes of leaking memory, conventional systems often do not provide a ready means for understanding how to remedy the identified memory leak. Furthermore, it is often not even the responsibility of the allocating program to release or free the code. Therefore, even if conventional systems where able to identify the allocating line of code, there is no guarantee the responsibility to subsequently release that allocation resides with the allocating program, which further confounds users employing conventional systems.

Notwithstanding the many difficulties noted above with respect to native code, managed code presents even more complex issues with which to contend. For example, with managed code, there is no explicit release for an object. Rather, once no other object references the object in question, that object can be slated for garbage collection. Thus, in the case of managed code, the allocator is typically not responsible for releasing the allocated memory.

Moreover, with managed code, the Common Language Runtime (CLR) manages most memory for the application. Managed code such as Visual Basic (VB) or C Sharp (C#) does not explicitly free most memory uses. Rather, the CLR will periodically perform garbage collection. Generally speaking, garbage collection consists of a number of automatically performed operations. Such automatic operations can include, e.g., finding the "roots", for example, those objects that are to be kept alive, such as thread or application domains. Such automatic operations can also include enumerating starting from those roots to find all objects in memory that are referenced by those roots and repeating for each newly found object, which can result in an object reference graph; moving objects that are in use closer together in memory, effectively coalescing free memory to reduce fragmentation and thus obliterating those objects that are "collected"; and updating object-to-object references, e.g., notifying an object that its referenced objects have moved. Thus, garbage collection for managed code frees unreferenced objects.

Furthermore, as noted previously, a program can allocate memory in many ways. For example, native code can allocate memory by employing VirtualAlloc for larger chunks, e.g., 64 kilobyte increments. For smaller chunks of memory, code can employ HeapCreate, HeapAlloc. Additionally or alternatively, native code can employ § malloc, or the operator "new" in certain native-oriented languages. For managed code, a program can allocate memory be way of creation of managed objects such as the operator "new" in managed-oriented languages. A program can also allocate memory via types (e.g., classes), appdomains, modules, mapped files and sections, threads, and so forth.

All these memory uses, whether native or managed, eventually call VirtualAlloc internally. However, except for the managed objects, each of these memory use techniques has a corresponding mechanism to free the memory with an explicit program call. For managed objects, the CLR will free objects that have no references, so the code only need remove references to memory that is to be freed by CLR.

With the foregoing in mind, consider a particular memory allocation of 10 bytes has been identified as leaking. In conventional systems, such would by itself be very difficult to discover. However, upon discovery, how does one describe the leak and/or a suitable remedy? One could assign fault to the line of code that called the code that ordered the memory allocation. However, that line of code might be just a helper line that was called from yet another helper, etc.

Thus, we see the importance of call stacks in getting to the source of the matter. Table I below provides an example call stack that is an actual allocation of 32 bytes for the 8-character string "Priority". This string is stored in Unicode, which means 2*8=16 bytes, plus 2 null bytes. At the top of the stack provided by Table I, "Mine_RdAllocHeap", represents a Heap Allocation call that was intercepted (e.g., by intercept component 102). The next line, including, "ole32.dll!CRetailMalloc_Alloc" can be identified as the code that directs the actual allocation of memory, but we see this information does not necessarily tell us anything interesting. Instead, we have to scan the stack downward a few lines at a time and see that "Priority" is some sort of Provider Column related to a TaskList, which was created by a Service Provider from a VB Project creation, which itself stems from a Solution open, from an Open Solution Dialog invoked from a menu item or button.

TABLE I

{ Address = 142bf8f0, SeqNo = 821218, Size = 32, Thread = 5996, StringContent = Priority, _HeapAllocationContainer = Address=0x142bf8f0, SeqNo=821,218, Size=32, Thread=5996 }
Heap = _Process Heap HeapHandle= 003a0000
Call Stack:
d:\memspect\vsassert\trackmem.cpp(2642) : Vsassert.dll!Mine_RtlAllocHeap + 573 bytes
d:\win7_gdr\com\ole32\com\class\memapi.cxx(641) : ole32.dll!CRetailMalloc_Alloc + 22 bytes
d:\w7rtm\com\oleaut32\typelib\oautil.cpp(833) : OLEAUT32.dll!APP_DATA::AllocCachedMem + 96 bytes
d:\w7rtm\com\oleaut32\dispatch\bstr.cpp(107) : OLEAUT32.dll!SysAllocStringLen + 61 bytes
d:\w7rtm\com\oleaut32\dispatch\bstr.cpp(71) : OLEAUT32.dll!SysAllocString + 44 bytes
f:\dd\env\msenv\textmgr\task.cpp(223) : msenv.dll!CopyColumn + 59 bytes
f:\dd\env\msenv\textmgr\task.cpp(4929) : msenv.dll!CProviderNode::SetupColumns + 250 bytes
f:\dd\env\msenv\textmgr\task.cpp(3695) : msenv.dll!CProviderNode::CProviderNode + 409 bytes
f:\dd\env\msenv\textmgr\task.cpp(8407) : msenv.dll!CTaskList::RegisterTaskProvider + 209 bytes
f:\dd\env\msenv\textmgr\usertask.cpp(938) : msenv.dll!CUserTaskProvider::RegisterWithTaskList + 36 bytes
f:\dd\env\msenv\textmgr\task.cpp(8363) : msenv.dll!CTaskList::Initialize + 97 bytes
f:\dd\env\msenv\textmgr\taskpkg.cpp(262) : msenv.dll!CTaskListPackage::QueryService + 112 bytes
f:\dd\env\msenv\core\proffer.cpp(1639) : msenv.dll!CGlobalServiceProvider::QueryService + 160 bytes
f:\dd\vscommon\hierutil7\vsmodule.cpp(151) : msvbprj.dll!CVxModule::QueryService + 45 bytes
f:\dd\vsproject\langproj\langproj.cpp(236) : msvbprj.dll!CLangProject::CreateTaskProvider + 77 bytes
f:\dd\vsproject\langproj\langproj.cpp(637) : msvbprj.dll!CLangProject::OnAfterCreateProject + 59 bytes
f:\dd\vsproject\langproj\langproj.cpp(1205) : msvbprj.dll!CLangProject::CreateProject + 726 bytes
f:\dd\vsproject\vsproject\vbprject.cpp(580) : msvbprj.dll!CVsProject::CreateProject + 315 bytes
f:\dd\vsproject\vb\vbprj\vbprjfactory.cpp(278) : msvbprj.dll!CVbProjectFactory::InitializeForOwnerWorker + 456 bytes
f:\dd\vsproject\vsproject\vsprjfactory.cpp(527) : msvbprj.dll!CVsProjectFactory::InitializeForOwner + 73 bytes
f:\dd\vsproject\vsproject\vsprjfactory.cpp(458) : msvbprj.dll!CVsProjectFactory::CreateProject + 654 bytes
f:\dd\vsproject\vb\vbprj\vbprjfactory.cpp(168) : msvbprj.dll!CVbProjectFactory::CreateProject + 109 bytes
f:\dd\env\msenv\core\vsprjtyp.cpp(1824) : msenv.dll!CVsProjectType::HrOpenProject + 299 bytes
f:\dd\env\msenv\core\vsprjtyp.cpp(449) : msenv.dll!CVsProjectTypeMgr::HrOpenProject + 655 bytes
f:\dd\env\msenv\core\vsslnpst.cpp(14334) : msenv.dll!CSolution::Open + 9582 bytes
f:\dd\env\msenv\core\vsslnpst.cpp(13418) : msenv.dll!CSolution::Open + 202 bytes
f:\dd\env\msenv\core\dlgopen.cpp(408) : msenv.dll!OpenProjectOrSolutionDlg + 2560 bytes
f:\dd\env\msenv\core\vsprojui.cpp(1029) : msenv.dll!HandleOpenSolutionOrProjectCommand + 2027 bytes
f:\dd\env\msenv\core\vsshlcmd.cpp(2617) : msenv.dll!HrShellExec + 3439 bytes
f:\dd \env\msenv\core\vsshlmnu.cpp(2510) : msenv.dll!CVSCommandTarget::ExecCmd + 2557 bytes
f:\dd\env\msenv\core\surfacecommandingsupport.cpp(405) : msenv.dll!'anonymous namespace'::ExecForController + 204 bytes
f:\dd\env\msenv\core\surfacecommandingsupport.cpp(2700) : msenv.dll!CSurfaceCommandingSupport::ExecuteForController + 66 bytes
f:\dd\env\msenv\core\executevisitor.cpp(168) : msenv.dll!CExecuteVisitor::VisitButtonController + 451 bytes
f:\dd\env\msenv\core\controllervisitorbase.h(86) : msenv.dll!CControllerVisitorBase::DispatchVisit + 52 bytes
f:\dd\env\msenv\core\controllervisitorbase.h(47) : msenv.dll!CControllerVisitorBase::VisitController + 33 bytes
f:\dd\env\msenv\core\surfacecommandingsupport.cpp(2906) : msenv.dll!CSurfaceCommandingSupport::Execute + 59 bytes

TABLE I-continued f:\dd\env\msenv\cmdtable\services\commandmodelservice\models\impl\bases\executablecommandelementdatasource.h(92) : msenv.dll!CommandUI::Models::Impl::CExecutableCommandElementDataSource::Execute + 76 bytes
f:\dd\env\msenv\cmdtable\services\commandmodelservice\models\impl\bases\executablecommandelementdatasource.h(133) : msenv.dll!CommandUI::Models::Impl::CExecutableCommandElementDataSource::ExecuteVerb Handler + 102 bytes
f:\dd\env\gel\lib\gelutil\cdatasource.cpp(246) : msenv.dll!Gel::CDataSource::Invoke + 50 bytes
Microsoft.VisualStudio.Shell.11.0.ni.dll!0x615B3777
Microsoft.VisualStudio.Shell.11.0.dll!Microsoft.Internal.VisualStudio.PlatformUI.DataSource.Invoke
Microsoft.VisualStudio.Shell.UI.Internal.dll!Microsoft.VisualStudio.PlatformUI.VsCommand.Execute
PresentationFramework.dll!MS.Internal.Commands.CommandHelpers.CriticalExecuteCommandSource
PresentationFramework.dll!System.Windows.Controls.MenuItem.InvokeClickAfterRender
WindowsBase.dll!System.Windows.Threading.ExceptionWrapper.InternalRealCall
WindowsBase.dll!MS.Internal.Threading.ExceptionFilterHelper.TryCatchWhen
WindowsBase.dll!System.Windows.Threading.DispatcherOperation.InvokeImpl
WindowsBase.dll!System.Windows.Threading.DispatcherOperation.InvokeInSecurityCont ext
mscorlib.dll!System.Threading.ExecutionContext.runTryCode
f:\dd\ndp\clr\src\vm\callhelpers.cpp(77) : clr.dll!CallDescrWorkerWithHandler + 138 bytes
f:\dd\ndp\clr\src\vm\method.cpp(2563) : clr.dll!MethodDesc::CallDescr + 403 bytes
f:\dd\ndp\clr\src\vm\method.cpp(2196) : clr.dll!MethodDesc::CallTargetWorker + 31 bytes
f:\dd\ndp\clr\src\vm\callhelpers.h(500) : clr.dll!MethodDescCallSite::CallWithValueTypes + 26 bytes
f:\dd\ndp\clr\src\vm\reflectioninvocation.cpp(2950) : clr.dll!ExecuteCodeWithGuaranteedCleanupHelper + 185 bytes
f:\dd\ndp\clr\src\vm\reflectioninvocation.cpp(3023) : clr.dll!ReflectionInvocation::ExecuteCodeWithGuaranteedCleanup + 251 bytes
mscorlib.dll!System.Threading.ExecutionContext.Run
mscorlib.dll!System.Threading.ExecutionContext.Run
WindowsBase.dll!System.Windows.Threading.DispatcherOperation.Invoke
WindowsBase.dll!System.Windows.Threading.Dispatcher.ProcessQueue
WindowsBase.dll!System.Windows.Threading.Dispatcher.WndProcHook
WindowsBase.dll!MS.Win32.HwndWrapper.WndProc
WindowsBase.dll!MS.Win32.HwndSubclass.DispatcherCallbackOperation
WindowsBase.dll!System.Windows.Threading.ExceptionWrapper.InternalRealCall
WindowsBase.dll!MS.Internal.Threading.ExceptionFilterHelper.TryCatchWhen
WindowsBase.dll!System.Windows.Threading.Dispatcher.InvokeImpl
WindowsBase.dll!MS.Win32.HwndSubclass.SubclassWndProc
d:\w7rtm\windows\core\ntuser\client\i386\callproc.asm(106) : USER32.dll!InternalCallWinProc + 35 bytes
d:\w7rtm\windows\core\ntuser\client\clmsg.c(163) : USER32.dll!UserCallWinProcCheckWow + 331 bytes
d:\w7rtm\windows\core\ntuser\client\clmsg.c(2591) : USER32.dll!DispatchMessageWorker + 862 bytes
d:\w7rtm\windows\core\ntuser\client\cltxt.h(999) : USER32.dll!DispatchMessageW + 15 bytes
f:\dd\env\msenv\core\main.cpp(1270) : msenv.dll!ProcessMessage + 120 bytes
f:\dd\env\msenv\core\msocm.cpp(499) : msenv.dll!CMsoCMHandler::EnvironmentMsgLoop + 230 bytes
f:\dd\env\msenv\core\msocm.cpp(410) : msenv.dll!CMsoCMHandler::FPushMessageLoop + 350 bytes
f:\dd\env\msenv\mso\core\cistdmgr.cpp(2244) : msenv.dll!SCM::FPushMessageLoop + 174 bytes
f:\dd\env\msenv\mso\core\cistdmgr.cpp(3000) : msenv.dll!SCM_MsoCompMgr::FPushMessageLoop + 42 bytes
f:\dd\env\msenv\core\msocm.cpp(816) : msenv.dll!CMsoComponent::PushMsgLoop + 46 bytes
f:\dd\env\msenv\core\main.cpp(951) : msenv.dll!VStudioMainLogged + 1289 bytes
f:\dd\env\msenv\core\main.cpp(1042) : msenv.dll!VStudioMain + 165 bytes
f:\dd\appid\lib\utils.cpp(735) : devenv.exe!util_CallVsMain + 231 bytes
f:\dd\appid\devenv\stub\devenv.cpp(641) : devenv.exe!CDevEnvAppId::Run + 2328 bytes
f:\dd\appid\devenv\stub\winmain.cpp(58) : devenv.exe!WinMain + 178 bytes
f:\dd\vctools\crt_bld\boot_x86\crt\src\crtexe.c(548) : devenv.exe!_tmainCRTStartup + 334 bytes
d:\win7_gdr\base\win32\client\thread.c(65) : kernel32.dll!BaseThreadInitThunk + 14 bytes
d:\win7_gdr\minkernel\ntos\rtl\rtlexec.c(3183) : ntdll.dll!_RtlUserThreadStart + 112 bytes
d:\win7_gdr\minkernel\ntos\rtl\rtlexec.c(3111) : ntdll.dll!_RtlUserThreadStart + 27 bytes
142bf8f0 : 00000010 00720050 006f0069 00690072 00790074 afaf0000 afafafaf afafafaf
10 00 00 00 50 00 72 00 69 00 6f 00 72 00 69 00 74 00 79 00 00 00 af af af af af af af af
Priority Table I, above, represents a line-by-line output of an example call stack with managed code sections emphasized in bold font. The first line before the call stack describes the allocation. At the bottom is the actual 32 bytes displayed in three ways: as 4-byte integers, as bytes, and as characters.

In accordance with the subject matter described herein, various aspects or embodiments can provide one or more mechanisms (e.g., system 100 and related elements) to help identify various memory issues. Typically, in order to solve the issues that exist in conventional approaches, it is understood that a given solution can start with intercepting memory allocation calls. Any associated free call can also be intercepted. Such can include intercepting both managed and native allocation and free calls. The interception code can record the call stack of the caller as well as a few other bits of information such as the size, thread, and Sequence Number (1,2,3 . . . ) and can store this information in an associated Tag, all of which is substantially consistent with what has been described supra.

In order to underscore various objectives and constraints, it is noted that implementation can, e.g., (1) call or forward the underlying intercepted code in order for the program to behave correctly, ideally in a manner that minimizes resultant delay. (2) Operate extremely rapidly while utilizing as little memory as feasible and thus reduce potential program operation disruption. (3) Operate in a manner that is recursion-aware, since intercepted code can call other code or functions that can themselves be intercepted. (4) Operate in a manner that is thread-safe, given a particular application, program, or process can have scores of threads, each potentially including the capability of allocating memory.

Hence, for allocations, the disclosed subject matter can, generally, generate and store the associated tag containing the call stack and associated that tag with the actual memory allocation. For release or free operations, one feature includes matching an associated tag and freeing that tag along with the underlying memory. As a result, it is readily apparent that any currently allocated memory will typically have an associated tag.

Moreover, since part of the disclosed subject matter relates to call stacks, it is noted that recording of the call stack can require a fairly complex series of steps or acts, especially because various stack sections can be managed or native code, respectively, and procedures to walk each section type are quite different. While existing tools can be used to intercept memory calls, such tools can differ depending upon whether or not the case at hand is processing native code or managed code.

For example, to intercept native memory calls in a Windows-based environment, a tool known as Detours (see http colon slash slash research dot Microsoft dot com slash en dash us slash projects slash detours slash) can be employed. On the other hand, managed memory calls can be intercepted via ICorProfilerCallBack, which is a mechanism with which CLR notifies user code about certain events, including, e.g., AppDomain, Assembly, Class, Module Load Start/Finish, Objects Allocated (e.g., when a managed CLR object is created), GarbageCollectionStarted, GargageCollectionFinished, and so forth. For additional details relating to ICorProfilerCallBack, see http colon slash slash msdn dot Microsoft dot com slash en dash us slash library slash ms230818 dot aspx. It is understood that while two examples have been provided above for intercepting memory calls, other examples can exist. It is also understood that the disclosed subject matter is not necessarily limited to Windows-based environments, although such an environment serves as a ready example.

As noted above, the disclosed subject matter involves handling of the call stack-embedded tags that allow matching of a memory allocation with its associated memory free, and can accomplish such even though an allocated object has undergone garbage collection. In more detail, generally speaking, every application heap has a wrapper. This wrapper can contain the associated table of tags and these table and tags can be stored in a private heap (e.g., private heap 120) that does not have the wrapper. When a heap allocation is intercepted, the tag and its included call stack can be generated and stored in the private heap.

Likewise, when a memory release or free occurs for the heap, the intercepted free finds and frees the associated tag. Notice, such is straightforward for tracking heap allocations. However, for all other types of allocations, such as managed objects, VirtualAllocs, mapped files, and so on another single private heap can be created with the wrapper, which is referred to herein as the MemSpect heap. Thus, interception of the latter type of calls merely puts some information about the call (e.g., Managed Class ID, VirtualAlloc type, Mapped Filename) into the _MemSpect heap, which can be a different set of information recorded to a particular tag that is included in the first described private heap. Because the _MemSpect heap is a wrapped heap, the call stack can be automatically calculated and stored as a normally intercepted heap allocation.

For managed objects, e.g., GC Start and GC Finish, those objects can be intercepted and the tags for the managed objects that were collected and moved can be processed. Each managed object can have an ID that represents the associated address in memory. However, note that this address can change as objects are moved around, which can occur during conventional garbage collection operations. Thus, garbage collection deals with ranges of objects that are defined as a starting address and a length. Put another way, managed object allocations can be intercepted. The garbage collection operation can also be intercepted and interpreted to determine if the object has been "freed" or collected.

Hence, ICorProfilerCallBack2:: GarbageCollectionStarted can indicate the number and kind of garbage collection that is starting. In addition, it is understood the CLR maintains several "Generations" of objects. For example, an object typically starts at Gen0. If that objects survives long enough, the object is promoted to Gen1, and so on. Generally, the higher the generation count, the less often an underlying object is collected. Moreover, some objects are considered too large for moving, so such large objects exist in a higher generation. At this point, ICorProfilerInfo2::GetGenerationBounds can be called to find the ranges of object IDs that will undergo collection in each generation for this particular invocation of garbage collection.

In addition, ICorProfilerCallBack::MovedReferences can be leveraged to indicate the multiple ranges of object IDs that have moved. These object IDs can be collected and saved into RangeCollection for processing in GCFinished. Furthermore, ICorProfilerCallBack2::SurvivingReferences can indicate the multiple ranges of object IDs that have survived garbage collection. These surviving object IDs can also be collected and saved into RangeCollection for processing in GCFinished. Finally, ICorProfilerCallBack2::GarbageCollectionFinished is where the tracking for the objects can be resolved, for which example logical code is provided below:

```
//Start Code
    For each Generation
        If this Gen is being collected
            For each generation bound
                If the generation bound is the same as the
gen being collected
                    DoRangeWalk
                End If
            End For // each gen bound
        End if
    End for// each generation
DoRangeWalk:
    // we'll do a parallel walk of RangeCollection and __MemSpect
    objects
    // must be very fast and careful walking ranges while inserting or
deleting into them
    Initialize the MovedTagInfoList
    Calculate the lowest and highest object in the generation bounds
    Calculate the lowest and highest in the __MemSpect Heap based
on the generation bounds
RangeCurrent = RangeCollection(lowest in generation)
if (RangeCurrent not at end)
For each object between the lowest and highest in the __MemSpect Heap
    while the object is beyond RangeCurrent
        RangeCurrent = next in RangeCollection
        If RangeCurrent at end
            Exit For
        End if
    End while
    If the object is within RangeCurrent
        ProcessObject
    End if
End For
    ProcessMovedObjectList
End if
ProcessObject:
    If the Object Survived
        Increment the associated object's Survival Counter and
        generation
    Else if Moved
        // now we must patch the object in the __MemSpect heap:
        // essentially we create a new Tag with the new object ID,
copy the old call stack to it
        // then add info about the move to a MovedTagInfoList
        Find the object's original Tag
        Allocate memory in the private heap and copy
the original tag including call stack we're about to delete
        Create a new TagInfo based on the original (same as Tag
without the call stack)
        Increment the New TagInfo's Moved Counter
        Record the generation number in the New TagInfo (could
have moved generation)
        Save info about move into a MovedTagInfoList
        Free the associated tag in the __MemSpect heap
    Else
        // didn't move or survive: Must have been collected.
        Find and Increment the associated class's Collected Counter
        Free the associated tag in the __MemSpect heap
    End if
ProcessMovedObjectList:
// avoid inserting while the ranges are being walked
For each tag in MovedTagInfoList
    Add the TagInfo into the __MemSpect heap // this uses the current
call stack, which needs to be patched
    Find the callstack of the Tag just added
    Replace with the call stack in the MovedTagInfoList
End For
//End Code
```

Figure 6:
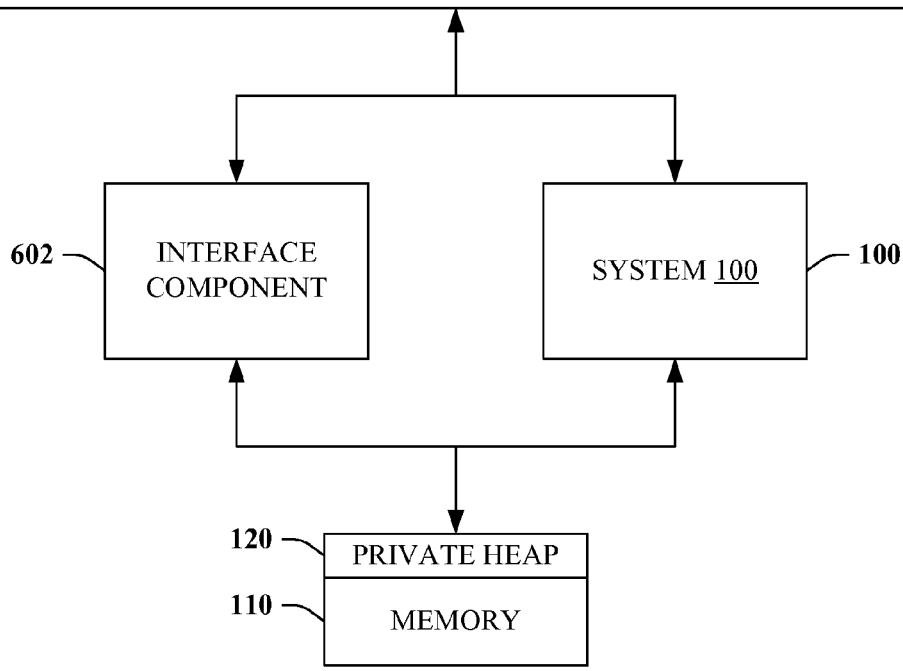
FIG. 6 is block diagram of an exemplary system that can present various views of data tracked by the disclosed subject matter.

Referring now to FIG. 6, system 600 that can present various views of data tracked by the disclosed subject matter is depicted. Generally, system 600 can include all or a portion of system 100 substantially detailed supra. In addition, system 600 can further include interface component that can be configured to present data included in tag 118. Such data can be presented by way of a user interface, example features of which are illustrated by example user interface features 604. It is understood that interface component 602 and/or one or more elements included in system 100 can be operatively or communicatively coupled to memory 110, including private heap 120.

In one or more aspect, interface component 602 can be further configured to present information derived from data included in tag 118. Accordingly, views or interpretations provided by interface component 602 can be based upon express data included in one or more tag 118 or can be derived from such data. In one or more aspect, interface component 602 can be further configured to contemporaneously present information associated with multiple call stacks associated with multiple tags (e.g., tag 118).

Furthermore, in one or more aspect, interface component 602 can be further configured to present a file name associated with the memory allocation instruction (e.g., memory allocation call 112). Likewise, in one or more aspect, interface component 602 can be further configured to present a file line number associated with the memory allocation instruction. In addition, in one or more aspect, interface component 602 can be further configured to present a module name associated with the memory allocation instruction. Similarly, in one or more aspect, interface component 602 can be further configured to present a class name associated with the memory allocation instruction. Furthermore, in one or more aspect, interface component 602 can be further configured to present a method name associated with the memory allocation instruction.

Additionally or alternatively, in one or more aspect, interface component 602 can be further configured to present a list of the at least one process 106 ordered by the number of associated memory allocations. Moreover, in one or more aspect, interface component 602 can be further configured to present a list of the at least one process 106 ordered by the total memory size of associated memory allocations.

Figure 7:
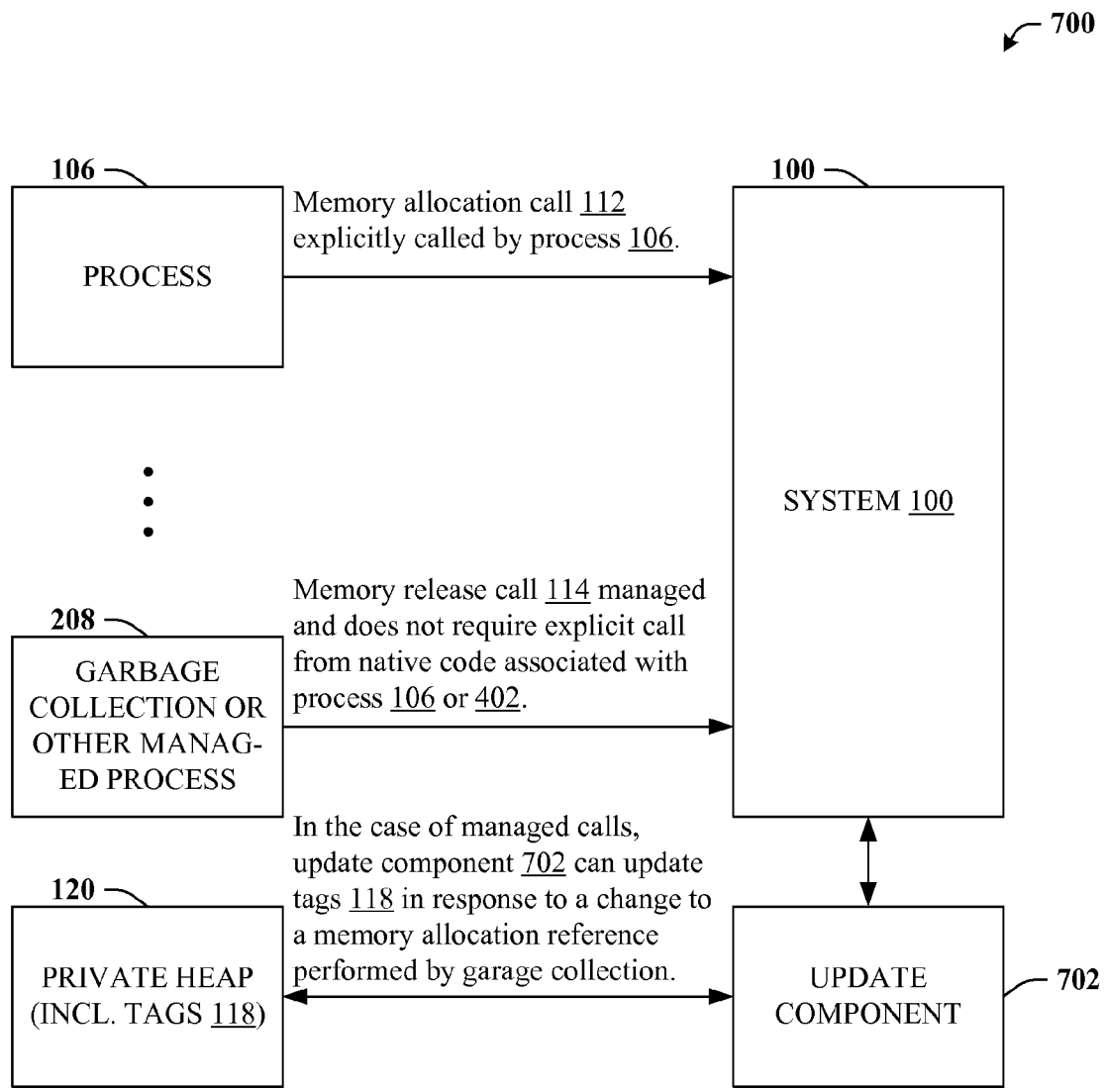
FIG. 7 is block diagram of an exemplary system that can facilitate memory tracking in a managed memory environment.

Turning now to FIG. 7, system 700 that can facilitate memory tracking in a managed memory environment is illustrated. In generally, system 700 can include all or portions of system 100 as described herein. Hence, system 100 can intercept memory allocation call 112 that is explicitly called by process 106. When assuming a different process is responsible for releasing that allocated memory, such as garbage collection process 208. Memory released in this manner does not require explicit call from native code. Moreover, such memory can be moved, which can change addresses or pointers to those portions of memory.

Accordingly, system 700 can further include update component 702 that can be configured to update tag 118 in response to a change to a memory allocation reference provided by garbage collection process 208. It is understood that example implementations for such are described above, yet such examples need not be limiting in nature.

Figure 8:
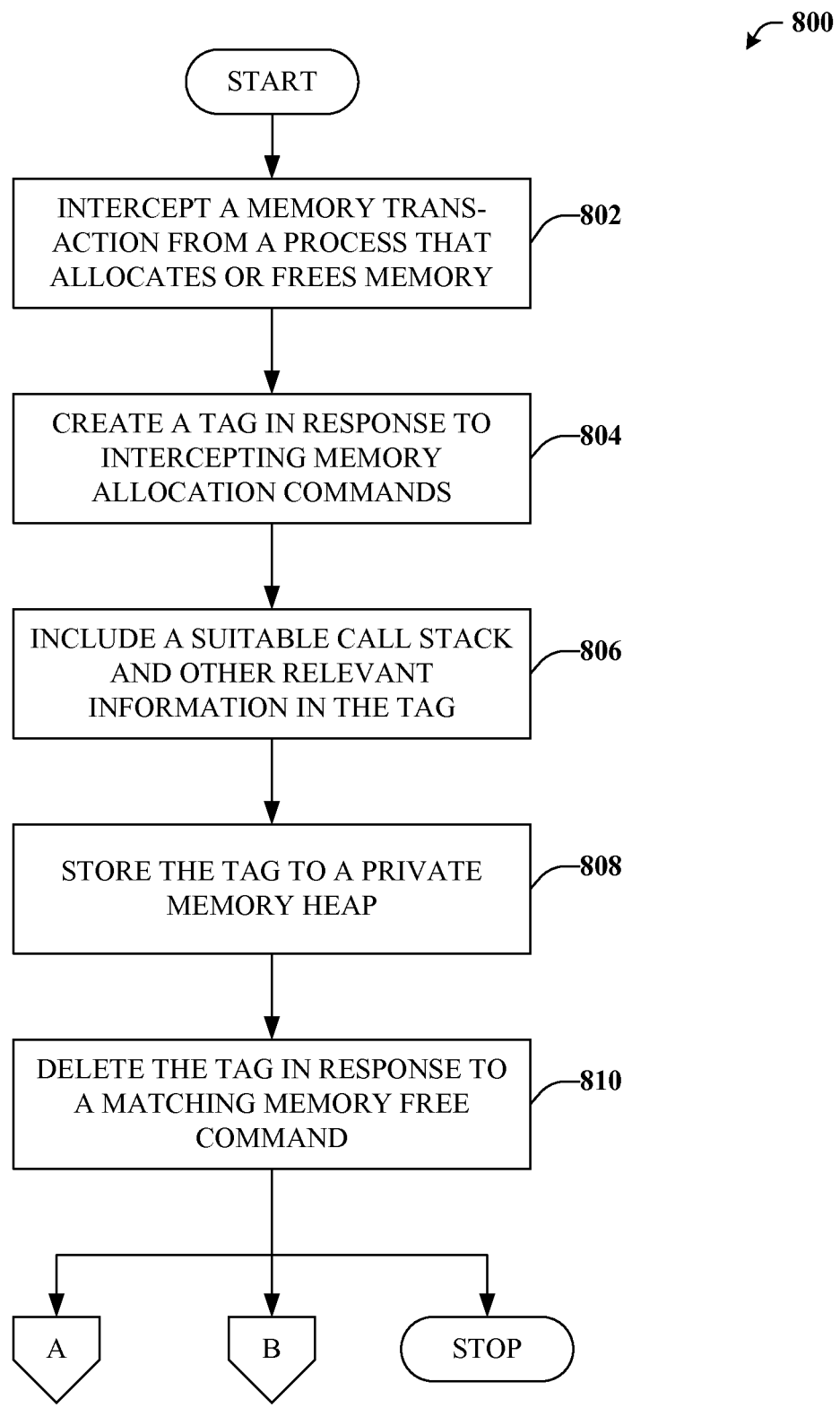
FIG. 8 is an exemplary non-limiting flow diagram for tracking computer-based memory provisioning.
Figure 9:
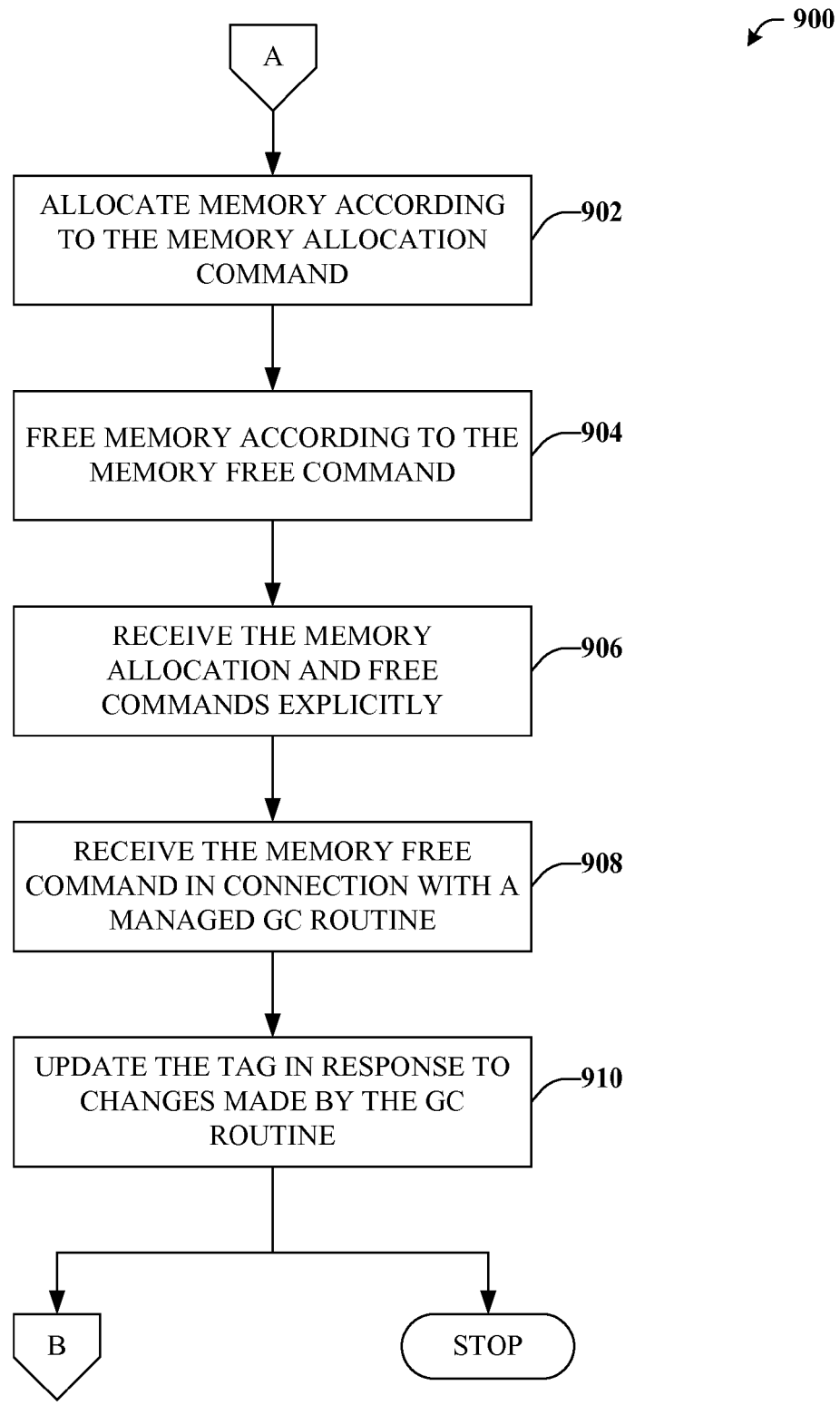
FIG. 9 is an exemplary non-limiting flow diagram for providing additional features or aspects in connection with tracking computer-based memory provisioning.
Figure 10:
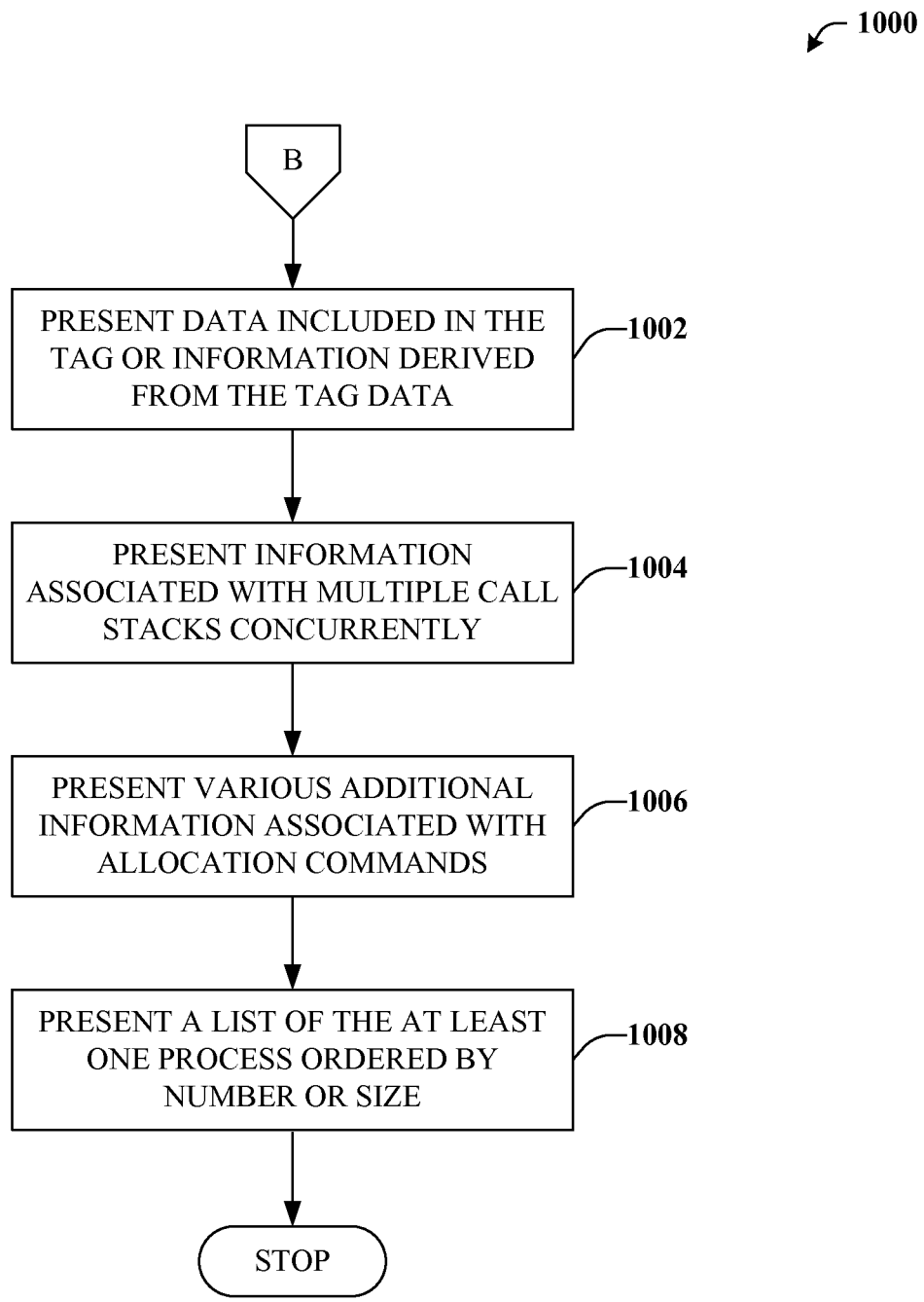
FIG. 10 is an exemplary non-limiting flow diagram for presenting data in connection with tracking computer-based memory provisioning.

FIGS. 8-10 illustrate various methodologies in accordance with the disclosed subject matter. While, for purposes of simplicity of explanation, the methodologies are shown and described as a series of acts, it is to be understood and noted that the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further noted that the methodologies disclosed hereinafter and throughout this disclosure are capable of being stored on an article of manufacture to facilitate transporting and transferring such methodologies to computers.

Referring now to FIG. 8, exemplary method 800 for tracking computer-based memory provisioning is depicted. Generally, at reference numeral 802, a processor can be employed for intercepting a memory transaction from at least one process that allocates computer memory or that frees computer memory, wherein the memory transaction is a memory allocation command or a memory free command.

Moreover, at reference numeral 804, a tag can be created in response to intercepting the memory allocation command of reference numeral 802. Upon creation of the tag, various information can be included therein. For example, at reference numeral 806, the tag a call stack associated with the at least one process, an allocation size of the memory allocation, a thread identification, and a tag sequence number can be included in the tag. It is noted that other information can be included in the tag, and that the particular type or character of information included in the tag can depend upon the type of memory allocation and/or memory release that is expected, e.g., native versus managed.

Regardless, at reference numeral 808, the tag can be stored to a private memory heap. This private memory heap can be specifically allocated for use by the disclosed subject matter, as detailed herein, and can have a wrapper or exist without a wrapper, e.g., based upon the type of memory allocation and/or memory release that is expected. Moreover, more than one private memory heap can exist, such as a first private heap for certain types of memory allocation/release and a second private heap for other types of memory allocation/release. However, regardless of the type of memory allocation/release, at reference numeral 810, the tag can be deleted in response to a matching memory free (or release) command.

Turning now to FIG. 9, exemplary method 900 for providing additional features or aspects in connection with tracking computer-based memory provisioning is illustrated. For example, at reference numeral 902, memory can be allocated according to the memory allocation command. Thus, even though the memory allocation command is intercepted, that command can be forwarded to its original destination in order to ensure the disclosed tracking features do not interfere with otherwise expected operation of a particular application or process.

Similarly, at reference numeral 904, memory can be released or freed according to the memory free command. Hence, as with allocation of the memory, subsequent freeing of that memory can be effectuated in a transparent manner that does not significantly affect normal operation of the application(s) or process(es) that is/are monitored, whether such is effectuated by forwarding the original memory free command or by some other means.

At reference numeral 906, the memory allocation command and the memory free command can be received as explicit instructions from the at least one process. Alternatively, at reference numeral 908, the memory free command and/or the memory allocation command can be received in connection with a system-managed garbage collection routine. In the latter case discussed with regard to reference numeral 908, then at reference numeral 910, the tag can be updated in response to a change in a memory allocation reference provided by the system-managed garbage collection routine.

With reference now to FIG. 10, exemplary method 1000 for presenting data in connection with tracking computer-based memory provisioning is provided. In general, at reference numeral 1002, data included in the tag or information derived from data included in the tag can be presented, for example by way of a user interface and according to one or several different views or pivots. At reference numeral 1004, information associated with multiple call stacks associated with multiple tags can be presented concurrently. It is to be underscored that conventional systems typically only display, at most, a single call stack, which has limited utility. However, the disclosed subject matter can provide views or other presentations that involve multiple call stacks.

Next to be described, at reference numeral 906, at least one of a file name associated with the memory allocation command, a file line number associated with the memory allocation command, a module name associated with the memory allocation command, a class name associated with the memory allocation command, or a method name associated with the memory allocation command can be presented. Furthermore, at reference numeral 908, a list of the at least one process ordered by one of: a number of associated memory allocations or a total memory size of associated memory allocations can be presented.

Exemplary Networked and Distributed Environments

One of ordinary skill in the art can appreciate that the various embodiments of dynamic composition described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the smooth streaming mechanisms as described for various embodiments of the subject disclosure.

Figure 11:
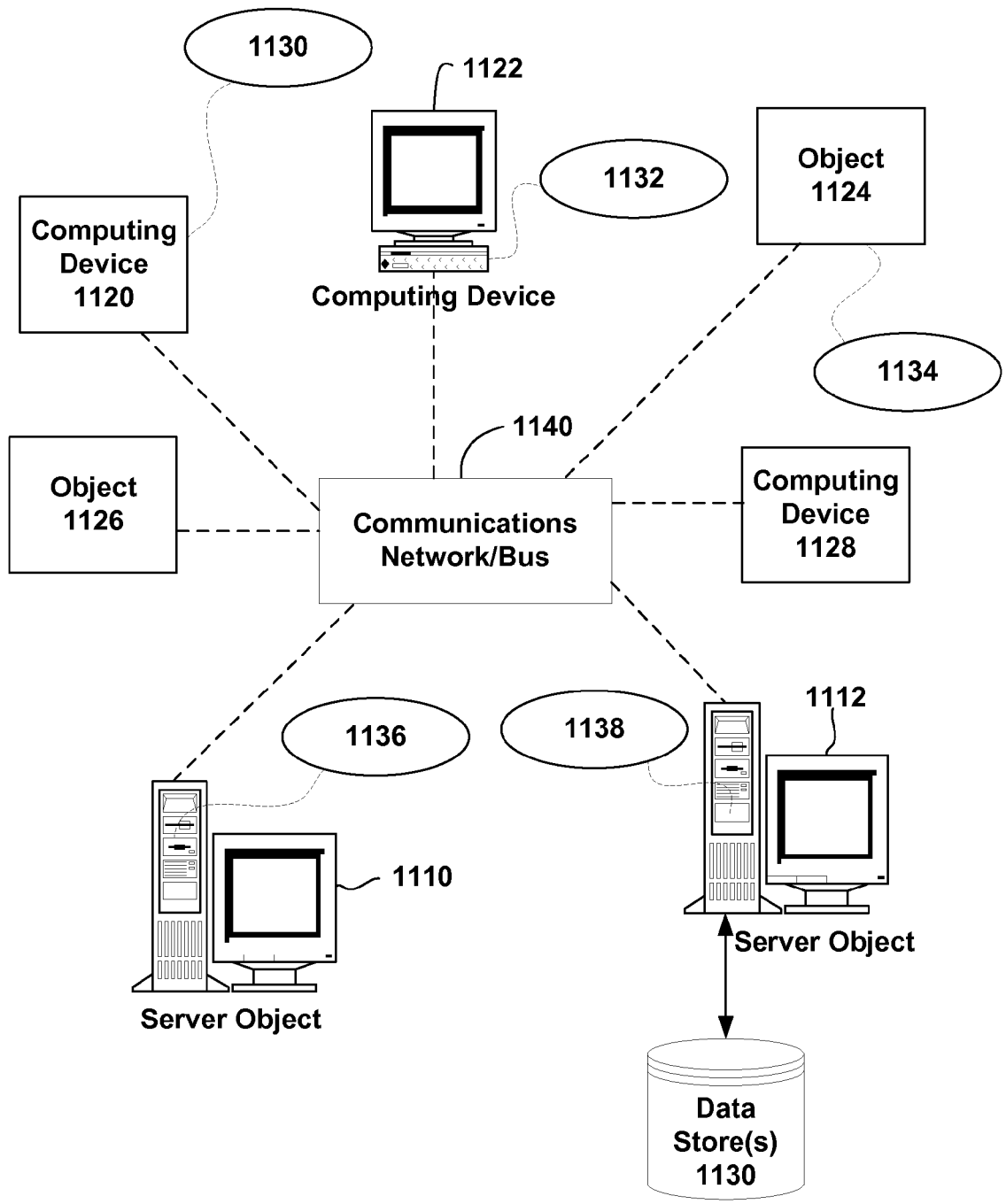
FIG. 11 is a block diagram representing an exemplary non-limiting networked environment in which the various embodiments may be implemented.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be noted that computing objects 1110, 1112, etc. and computing objects or devices 1120, 1122, 1124, 1126, 1128, etc. may comprise different devices, such as PDAs, audio/video devices, mobile phones, MP3 players, personal computers, laptops, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, network 1140 may comprise other computing objects and computing devices that provide services to the system of FIG. 11, and/or may represent multiple interconnected networks, which are not shown. Each computing object 1110, 1112, etc. or computing objects or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the smooth streaming provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the dynamic composition systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc. provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances. Any of these computing devices may be processing data, or requesting transaction services or tasks that may implicate the techniques for dynamic composition systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing read set validation or phantom checking can be provided standalone, or distributed across multiple computing devices or objects.

In a network environment in which the communications network/bus 1140 is the Internet, for example, the computing objects 1110, 1112, etc. can be Web servers with which the client computing objects or devices 1120, 1122, 1124, 1126, 1128, etc. communicate via any of a number of known protocols, such as the hypertext transfer protocol (HTTP). Servers 1110, 1112, etc. may also serve as client computing objects or devices 1120, 1122, 1124, 1126, 1128, etc., as may be characteristic of a distributed computing environment.

Exemplary Computing Device

As mentioned, advantageously, the techniques described herein can be applied to any device where it is desirable to perform dynamic composition. It is to be understood, therefore, that handheld, portable and other computing devices and computing objects of all kinds are contemplated for use in connection with the various embodiments, i.e., anywhere that a device may wish to read or write transactions from or to a data store. Accordingly, the below general purpose remote computer described below in FIG. 2 is but one example of a computing device. Additionally, a database server can include one or more aspects of the below general purpose computer, such as a media server or consuming device for the dynamic composition techniques, or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 12:
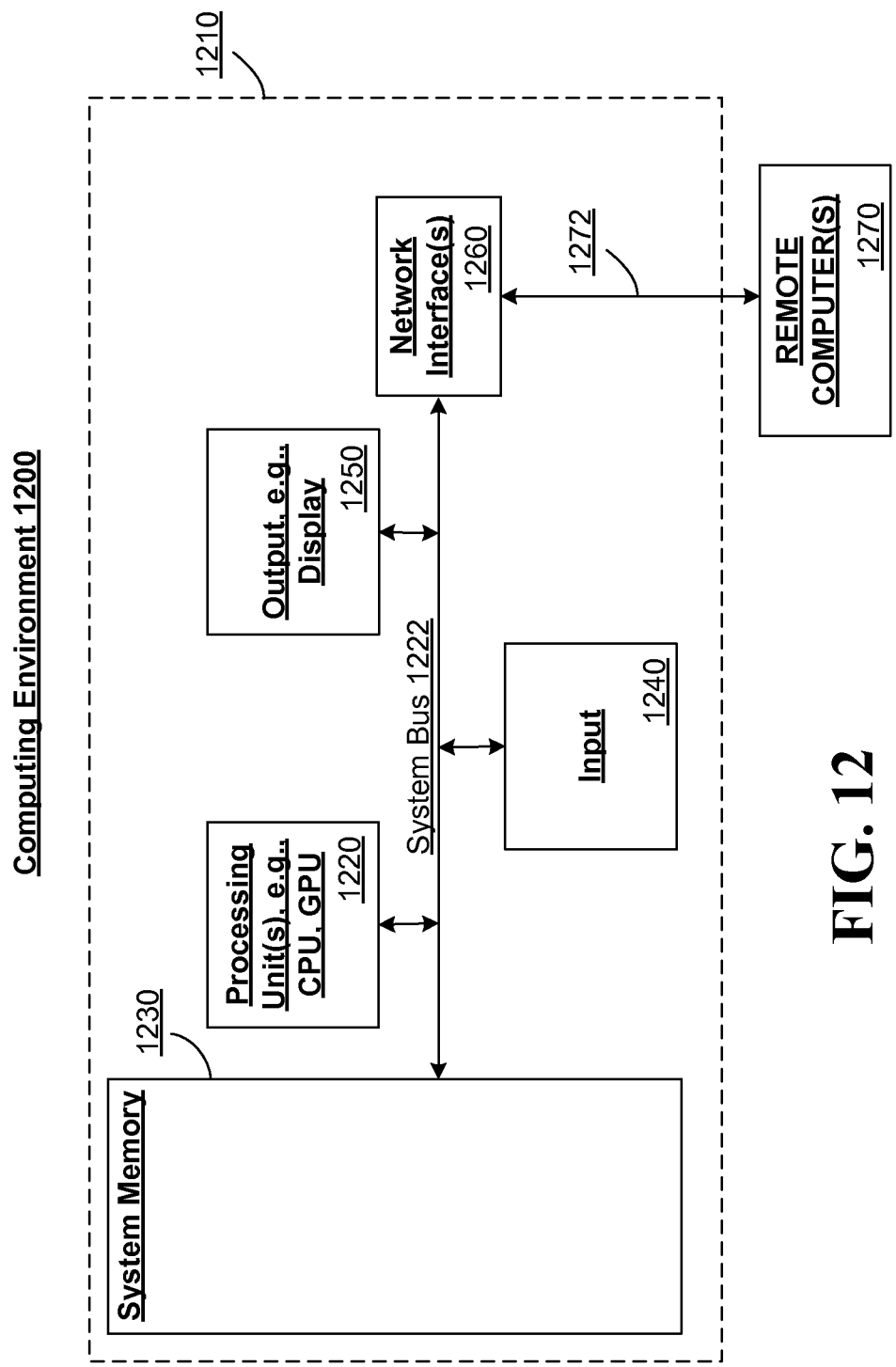
FIG. 12 is a block diagram representing an exemplary non-limiting computing system or operating environment in which the various embodiments may be implemented.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither is the computing environment 1200 be interpreted as having any dependency or requirement relating to any one or combination of components illustrated in the exemplary operating environment 1200.

With reference to FIG. 12, an exemplary remote device for implementing one or more embodiments includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, memory 1230 may also include an operating system, application programs, other program modules, and program data.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the dynamic composition techniques. Thus, embodiments herein are contemplated from the standpoint of an API (or other software object), as well as from a software or hardware object that implements one or more aspects of the smooth streaming described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be noted that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better noted with reference to the flowcharts of the various figures. While for purposes of simplicity of explanation, the methodologies are shown and described as a series of blocks, it is to be understood and noted that the claimed subject matter is not limited by the order of the blocks, as some blocks may occur in different orders and/or concurrently with other blocks from what is depicted and described herein. Where non-sequential, or branched, flow is illustrated via flowchart, it can be noted that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
   an intercept component stored in a computer readable storage medium configured to intercept first and second memory calls issued by at least one process to an intended destination that allocates computer memory or releases computer memory, wherein the intended destination is different than the intercept component, and wherein the first memory call is a memory allocation instruction and the second memory call is a memory release instruction;
   a record component configured to create and store a tag in response to the intercept of the first memory call, wherein the tag created in response to the intercept of the first memory call includes a call stack associated with the at least one process, an allocation size of the memory allocation instruction, a thread identification, and a tag sequence number; and
   a matching component configured to delete the tag in response to the intercept of the second memory call if the memory release instruction matches the memory allocation instruction.

2. The system of claim 1, wherein the intercept component is further configured to forward the intercepted memory call to the intended destination to allocate memory in accordance with the memory allocation instruction.

3. The system of claim 1, wherein the intercept component is further configured to forward the intercepted memory call to the intended destination to release memory in accordance with the memory release instruction.

4. The system of claim 1, wherein the memory allocation instruction and the memory release instruction are native instructions explicitly provided by the at least one process.

5. The system of claim 1, wherein the memory release instruction is a managed instruction provided by a garbage collection process.

6. The system of claim 1, further comprising an interface component configured to present data included in the tag.

7. The system of claim 6, wherein the interface component is further configured to present information derived from data included in the tag.

8. The system of claim 6, wherein the interface component is further configured to contemporaneously present information associated with multiple call stacks associated with multiple tags.

9. The system of claim 6, wherein the interface component is further configured to present a file name associated with the memory allocation instruction.

10. The system of claim 6, wherein the interface component is further configured to present a file line number associated with the memory allocation instruction.

11. The system of claim 6, wherein the interface component is further configured to present a module name associated with the memory allocation instruction.

12. The system of claim 6, wherein the interface component is further configured to present a class name associated with the memory allocation instruction.

13. The system of claim 6, wherein the interface component is further configured to present a method name associated with the memory allocation instruction.

14. The system of claim 6, wherein the interface component is further configured to present a list of the at least one process ordered by number of associated memory allocations.

15. The system of claim 6, wherein the interface component is further configured to present a list of the at least one process ordered by total memory size of associated memory allocations.

16. The system of claim 1, further comprising an update component configured to update the tag in response to a change to a memory allocation reference provided by a garbage collection process.

17. A method, comprising:
    employing a computer-based processor to facilitate intercepting first and second memory transactions issued by at least one process to an intended destination that allocates computer memory or frees computer memory, wherein the first memory transaction is a memory allocation command and the second memory transaction is a memory free command, and wherein the first and second memory transactions are intercepted before reaching the intended destination;
    creating a tag in response to the intercepting of the first memory transaction, wherein the creating the tag includes creating a call stack associated with the at least one process, an allocation size of the memory allocation command, a thread identification, and a tag sequence number;
    storing the tag to a private memory heap; and
    deleting the tag in response to the intercepting of the second memory transaction if the memory free command matches the memory allocation command.

18. The method of claim 17, further comprising at least one of the following:
    allocating memory according to the memory allocation command;
    freeing memory according to the memory free command;
    receiving the memory allocation command and the memory free command as explicit instructions from the at least one process; receiving the memory free command in connection with a system-managed garbage collection routine; or
    updating the tag in response to a change in a memory allocation reference provided by the system-managed garbage collection routine.

19. The method of claim 17, further comprising at least one of the following:
    presenting data included in the tag or information derived from data included in the tag;
    presenting information associated with multiple call stacks associated with multiple tags concurrently;
    presenting at least one of a file name associated with the memory allocation command, a file line number associated with the memory allocation command, a module name associated with the memory allocation command, a class name associated with the memory allocation command, or a method name associated with the memory allocation command; or
    presenting a list of the at least one process ordered by one of: a number of associated memory allocations or a total memory size of associated memory allocations.

20. A computer readable storage media comprising computer executable instructions that, in response to execution, cause a computing device to perform operations comprising: intercepting with an intercept component memory allocation calls and memory release calls issued by at least one process to an intended destination that allocates computer memory or frees computer memory according to either managed commands or native instructions, wherein the intended destination is different than the intercept component; allocating memory as a function of the memory allocation calls; generating and storing a tag in response to the intercepting of at least one memory allocation call of the memory allocation calls including generating and storing a call stack associated with the at least one process, an allocation size of the at least one memory allocation call, a thread identification, and a tag sequence number, and deleting the tag and releasing the memory in response to a memory release call corresponding to the at least one memory allocation call.

* * * * *